United States Patent Office.

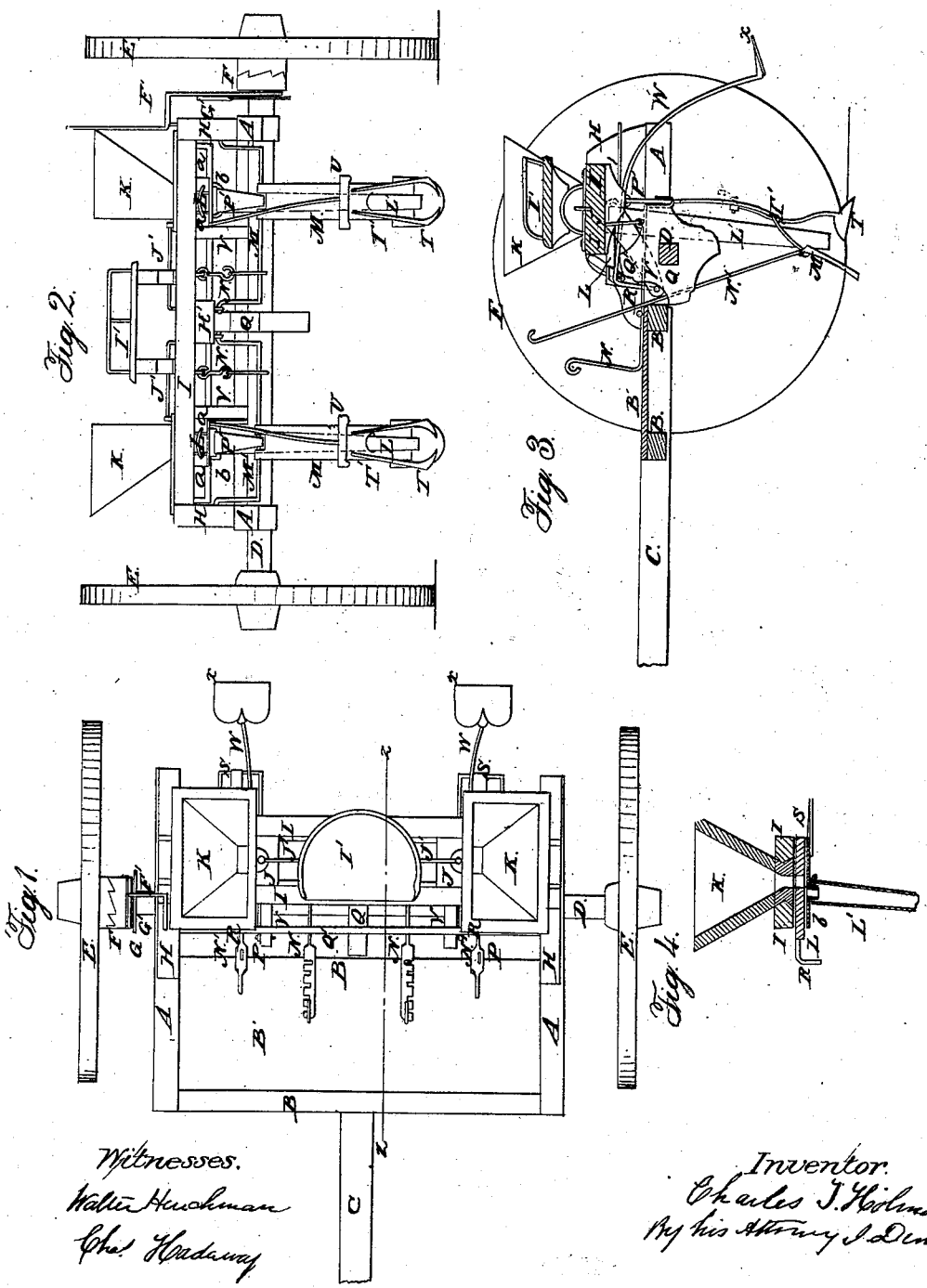

CHARLES T. HOLMAN, OF CONNEAUTVILLE, PENNSYLVANIA.

Letters Patent No. 65,810, dated June 18, 1867.

SEED-PLANTER.

*The Schedule referred to in these Letters Patent and making part of the same.*

TO ALL WHOM IT MAY CONCERN:

Be it known that I, CHARLES T. HOLMAN, of Conneautville, Crawford county, State of Pennsylvania, have invented certain new and useful improvements in Seed-Planters; and I do hereby declare the following description and accompanying drawings are sufficient to enable any person skilled in the art or science to which it most nearly appertains to make and use my said invention or improvements, without further invention or experiment.

The nature of my invention and improvements consists in the combination and arrangement of devices hereinafter described and claimed. In the accompanying drawings—

Figure 1 is a plan of a seed-planter with my improvements.

Figure 2 is an elevation of the rear of the machine; and

Figure 3 is a section on the line z z of fig. 1.

Figure 4 is a section of the hopper seed-slide and tube.

In these drawings, A A are the side-bars of the frame, connected by the cross-bars B B, to which the pole C is fastened, to which the animals are hitched in some convenient manner to draw the machine. The axle-tree D is fitted to turn in boxes fastened to the under side of the bars A A, and the wheels E E are fitted to turn freely on the axle D, and the clutch-box F is fitted to the axle, and worked by the lever F', to lock the right-hand wheel to the axle, and release it when desired; and the ratchet-wheel G is fastened to the clutch-box, for the pawl G' on the lever F to catch in, and enable the driver to turn and adjust the wheel and axle, so that the machine may make the hills opposite in the rows, to cultivate both ways. The space between the bars B is covered with a board, B', for the feet of the driver. The blocks H H are fastened to the bars A, to support the rails I I, which are fastened to the blocks to support the seat I' for the driver and the seeding apparatus. The blocks J J are fitted to traverse between the rails I, and may be adjusted to make the rows of a proper width, and fastened by the hooks J'. The hoppers K K are fastened to the blocks J, to receive the seed and supply it, through holes in the blocks, to the delivering-slides L L, which traverse across under the blocks J, and receive the seed from the hopper, and carry it over the tube L', and drop it, so that it falls through the tube behind the furrowing-tooth M, which is hung to the swinging-bar M', which bar is hung to the block H and block H' under the seat, and is adjusted and held by the link N, which extends forward and hooks on to a pin in the top of the bar B. The furrowing-tooth M extends down from the bar M', and is perforated for the tube L', which passes through it, and the tooth is held forward, in the position required, by the rod N', hitched on the pin P in the bar B. By this rod the tooth may be adjusted as required. The top of the furrowing-tooth is also connected by the link P' to the ways a a, fastened to the blocks J, so that the tooth, tube, and hopper may all traverse together to make the rows the required distance apart. The upper end of the seed-tube is hinged to the ways a a, to which ways the plate b is fastened to hold up the delivering-slides L; and this plate b has a short tube fastened to it to conduct the seed into the tube L'. The cam Q is fastened to the axle D, to vibrate the swinging-bar Q', which is pivoted in the blocks H H. This bar acts on the bent arms R R, from the slides L, to draw the slides and deliver the seed, which slides are drawn back by the rubber springs S S, connected to them for that purpose. The covering-scrapers T T are made in the form shown, and are carried by the rods T' T', which extend up through the shank of the furrowing-tooth, and are clamped to it by the blocks U U, so that they may be set higher or lower, as required. The brackets V V are fastened to the under side of the blocks J J, to form pivots for the hoe-levers W W, which are hung on the brackets, and carry the patting-hoes X X, which press or pat the earth over the seed, and mark the hills in the rows planted. These hoes are raised by the swinging-bar Q', acting on the levers W, when it draws the slide to drop the seed, and as the cam lets the swing-bar down, it lets the hoe drop and pat or press the earth over the seed. When the planter is used as a cultivator, I propose to reverse the covering-scrapers, so that they will assist in cultivating the crop. By mounting the hoppers and furrowing, planting, and covering devices on the traversing blocks, and making the swinging-bars Q' and M' of proper length, the machine may be adapted to rows of different widths with the greatest facility.

Having described my improvements—

I claim perforating the shank of the furrowing-tooth, and arranging the seed-tube to pass through it, substantially as described.

I claim arranging the hoppers on and hinging the furrowing, seeding, and covering fixtures or devices to the blocks J J, arranged to traverse between ways, and adapt the planter to rows of different widths, substantially as described.

And in combination with the devices hinged to the blocks J J, I claim the swinging-bar Q', worked by the cam Q, and so arranged as to work and operate the several parts in the different positions in which they may be placed, to vary the width of the rows planted.

I claim making the swinging-bar M', which connects the shank of the furrowing-tooth to the link, so long that the tooth and link may be traversed on it, substantially as described, in adjusting the machine to rows of different widths.

CHARLES T. HOLMAN.

Witnesses:
C. S. RUSHMORE,
N. TRUESDALE.